US012811266B2

(12) United States Patent
Howard

(10) Patent No.: US 12,811,266 B2
(45) Date of Patent: Nov. 24, 2026

(54) COAXIAL DIRECTIONAL MICROWAVE COUPLER

(71) Applicant: John Howard, Upper Mount Bethel, PA (US)

(72) Inventor: John Howard, Upper Mount Bethel, PA (US)

(73) Assignee: John Howard, Upper Mount Bethel, PA (US)

( * ) Notice: Subject to any disclaimer, the term of this patent is extended or adjusted under 35 U.S.C. 154(b) by 32 days.

(21) Appl. No.: 19/010,433

(22) Filed: Jan. 6, 2025

(65) Prior Publication Data

US 2025/0266599 A1 Aug. 21, 2025

Related U.S. Application Data

(60) Provisional application No. 63/553,674, filed on Feb. 15, 2024.

(51) Int. Cl.
*H01P 5/18* (2006.01)

(52) U.S. Cl.
CPC .................................... *H01P 5/183* (2013.01)

(58) Field of Classification Search
CPC .... H01P 5/183; H01P 5/18; H01P 5/12; H01P 5/16; H01P 5/184
USPC .......................................................... 333/109
See application file for complete search history.

(56) References Cited

U.S. PATENT DOCUMENTS 3,654,570 A * 4/1972 Thomas .................. H01P 5/183 333/33
4,547,753 A * 10/1985 Chapell ................... H01P 5/183 174/102 R

OTHER PUBLICATIONS

Cohn, "Shielded Coupled Strip Transmission Line", MTT-5, Oct. 1955, pp. 29-38.

* cited by examiner

*Primary Examiner* — Stephen E. Jones
(74) *Attorney, Agent, or Firm* — FisherBroyles, LLP

(57) ABSTRACT

A coaxial directional microwave coupler includes an outer conductor and a plurality of inner conductors at least partially surrounded by the outer conductor. The coaxial directional microwave coupler is implemented in accordance with specified equations, wherein $Z_{0e}$ and $Z_{0o}$ are desired design impedances, and K and K' are complete elliptic integrals of a first kind. A method of implementing a coaxial directional microwave coupler includes at least partially surrounding a plurality of inner conductors by an outer conductor, and implementing the coaxial directional microwave coupler in accordance with specified equations, wherein $Z_{0e}$ and $Z_{0o}$ are desired design impedances, and K and K' are complete elliptic integrals of a first kind.

6 Claims, 11 Drawing Sheets

Wireline with 12 mil Wires

COAXIAL DIRECTIONAL MICROWAVE COUPLER

CROSS-REFERENCE TO RELATED APPLICATION

This application claims the benefit of and priority to U.S. Provisional Application No. 63/553,674, filed Feb. 15, 2024, the disclosure of which is incorporated herein by reference in its entirety.

BACKGROUND

Field

The disclosed subject matter generally relates to coaxial directional microwave couplers and, more particularly, relates to wireflat square, rectangular, and circular coaxial directional microwave couplers.

Related Art

Microwave coupling devices can be used over a wide range of frequencies and operate around a predetermined center frequency. These coupling devices include inner conductors with at least one of the conductors being insulated. The inner conductors are placed adjacent to each other along their lengths and are typically twisted around each other to maintain relative positioning. A pliable insulating sleeve is provided around the inner conductors. The insulating sleeve and the conductors therein are housed in a shielding outer conductor, which is typically made from a copper-based alloy or aluminum.

SUMMARY

Various embodiments of the subject matter disclosed herein relate to a coaxial directional microwave coupler.

In one embodiment, a coaxial directional microwave coupler includes an outer conductor and a plurality of inner conductors at least partially surrounded by the outer conductor. The coaxial directional microwave coupler is implemented in accordance with the following equations, $$Z_{0e}\sqrt{K} = 29.976\pi\frac{K'(k_e)}{K(k_e)}\Omega \quad (1a)$$

$$Z_{0o}\sqrt{K} = 29.976\pi\frac{K'(k_o)}{K(k_o)}\Omega \quad (1b)$$

wherein $Z_{0e}$ and $Z_{0o}$ are desired design even mode impedance ($Z_{0e}$) and odd mode impedance ($Z_{0o}$) of the coupled structure and K and K' are complete elliptic integrals of the first kind, as further described in Cohn, Seymour, *Shielded Coupled Strip Transmission Line*, MTT-5, October 1955, pp. 29-37.

The coaxial directional microwave coupler may further be implemented in accordance with the following equations, $$\frac{W}{b} = \frac{2}{\pi}\operatorname{arctanh}\sqrt{k_e k_o} \quad (2a)$$

$$\frac{s}{b} = \frac{2}{\pi}\operatorname{arctanh}\left(\frac{\sqrt{k_e}}{1-k_e} + \frac{1-k_o}{\sqrt{k_o}}\right) \quad (2b)$$

wherein W represents a width of the inner conductors or a cross-sectional area of the inner conductors, s represents a spacing between the inner conductors, $k_o$ and $k_e$ are the arguments of the complete elliptic integral of the first kind, as further described in Cohn, Seymour, *Shielded Coupled Strip Transmission Line*, MTT-5, October 1955, pp. 29-37, and b represents the height of the substrate.

The parameters of the coaxial directional microwave coupler calculated in accordance with equations (2a) and (2b) may be converted to circular equivalents using the following equations, $$\frac{d_o}{d'} = \frac{1}{2}\left[1 + \frac{d''}{\pi d'}\left(1 + \ln\frac{4\pi d'}{d''}\right)\right], \text{ for } \frac{d''}{d'} \le 0.06 \quad (3a)$$

$$\frac{d_o}{d'} = \frac{1}{2}\left[1 + \frac{d''}{d'}\left(1 + \ln\frac{4\pi d'}{d''} + 0.510\left(\frac{d''}{d'}\right)^2\right)\right], \text{ for } 0.06 < \frac{d''}{d'} < 0.11 \quad (3b)$$

$$Z_0 = \frac{60}{\sqrt{\varepsilon_r}}\ln\frac{4b}{\pi d_0}\Omega \quad (3c)$$

wherein $Z_0$ represents a characteristic impedance of the substrate, $d_o$ represents a diameter of an equivalent circular cross section of the conductor, $\varepsilon_r$ represents a dielectric constant of the substrate, and d' and d" represent the larger and smaller dimensions, respectively, of the two rectangular inner conductors.

In another embodiment, a method of implementing a coaxial directional microwave coupler includes at least partially surrounding a plurality of inner conductors by an outer conductor, and implementing the coaxial directional microwave coupler in accordance with the following equations, $$Z_{0e}\sqrt{K} = 29.976\pi\frac{K'(k_e)}{K(k_e)}\Omega \quad (1a)$$

$$Z_{0o}\sqrt{K} = 29.976\pi\frac{K'(k_o)}{K(k_o)}\Omega \quad (1b)$$

wherein $Z_{0e}$ and $Z_{0o}$ are desired design even mode impedance ($Z_{0e}$) and odd mode impedance ($Z_{0o}$) of the coupled structure and K and K' are complete elliptic integrals of a first kind, as further described in. Cohn, Seymour, *Shielded Coupled Strip Transmission Line*, MTT-5, October 1955, pp. 29-37.

The method of implementing a coaxial directional microwave coupler may include implementing the coaxial directional microwave coupler in accordance with the following equations, $$\frac{W}{b} = \frac{2}{\pi}\operatorname{arctanh}\sqrt{k_e k_o} \quad (2a)$$

$$\frac{s}{b} = \frac{2}{\pi}\operatorname{arctanh}\left(\frac{\sqrt{k_e}}{1-k_e} + \frac{1-k_o}{\sqrt{k_o}}\right) \quad (2b)$$

wherein W represents a width of the inner conductors or a cross-sectional area of the inner conductors, s represents a spacing between the inner conductors, $k_o$ and $k_e$ represent the arguments of the complete elliptic integral of the first kind, as further described in Cohn, Seymour, *Shielded Coupled Strip Transmission Line*, MTT-5, October 1955, pp. 29-37, and b represents the height of the substrate.

The method of implementing a coaxial directional microwave coupler, may also include converting parameters of the coaxial directional microwave coupler calculated in accordance with equations (2a) and (2b) to circular equivalents using the following equations, $$\frac{d_o}{d'} = \frac{1}{2}\left[1 + \frac{d''}{\pi d'}\left(1 + \ln\frac{4\pi d'}{d''}\right)\right], \text{ for } \frac{d''}{d'} \le 0.06 \quad (3a)$$

$$\frac{d_o}{d'} = \frac{1}{2}\left[1 + \frac{d''}{d'}\left(1 + \ln\frac{4\pi d'}{d''} + 0.510\left(\frac{d''}{d'}\right)^2\right)\right], \text{ for } 0.06 < \frac{d''}{d'} < 0.11 \quad (3b)$$

$$Z_0 = \frac{60}{\sqrt{\varepsilon_r}}\ln\frac{4b}{\pi d_0}\Omega \quad (3c)$$

wherein $Z_0$ represents a characteristic impedance of the substrate, $d_o$ represents a diameter of an equivalent circular cross section of the conductor, $\varepsilon_r$ represents a dielectric constant of the substrate, and d' and d" represent the larger and smaller dimensions, respectively, of the two rectangular inner conductors.

Additional embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

The embodiments disclosed herein include square, rectangular, and circular microwave coaxial directional microwave couplers that exhibit no greater than −3 dB coupling by utilizing inner conductor separation and/or lengths greater than a 3 dB bandwidth. Conventional coaxial directional microwave couplers are limited to providing a maximum frequency of 5 GHz. In contrast, the disclosed embodiments operate at substantially greater frequencies than 5 GHz.

The selection of values for a set of parameters, which includes, but is not limited to, a width W of the inner conductors, a cross-sectional area of the inner conductors, a spacing s between the inner conductors, a dielectric constant K of the dielectric material or substrate surrounding the inner conductors, and dimensions, including thickness b of the outer conductor, are used in accordance with the embodiments disclosed herein to implement the microwave coaxial directional microwave coupler comprising a set of desired operating characteristics. The set of desired operating characteristics includes, but are not limited to a characteristic impedance $Z_o$, a design impedance $Z_{0_o}$, and a design impedance $Z_{0_e}$ of the coupled structure. One skilled in the art would not be able to implement a coaxial directional microwave coupler effectively and accurately based on the set of desired operating characteristics using only conventional techniques.

Figure 1:
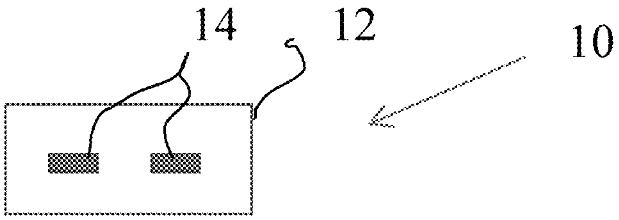
FIG. 1 shows a first embodiment of a coaxial directional microwave coupler comprising a rectangular outer conductor and rectangular inner conductors.
Figure 2:
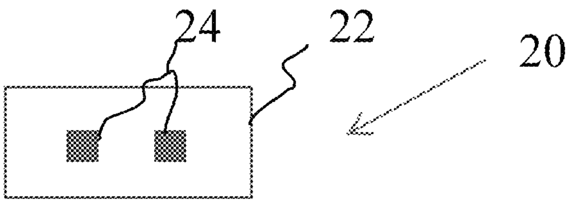
FIG. 2 shows a second embodiment of the coaxial directional microwave coupler comprising a rectangular outer conductor and square inner conductors.
Figure 3:
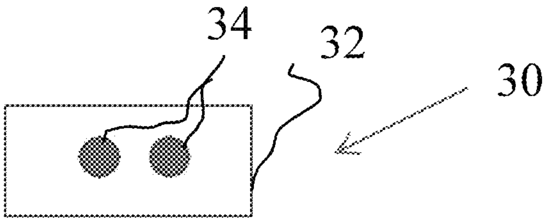
FIG. 3 shows a third embodiment of the coaxial directional microwave coupler comprising a rectangular outer conductor and circular inner conductors.
Figure 4:
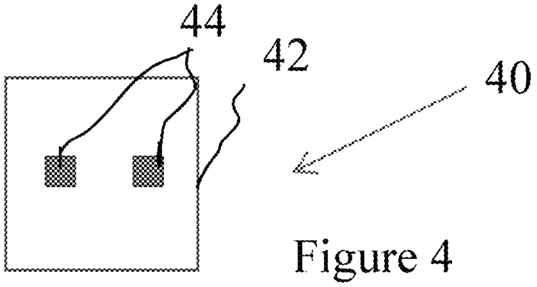
FIG. 4 shows a fourth embodiment of the coaxial directional microwave coupler comprising a square outer conductor and square inner conductors.
Figure 5:
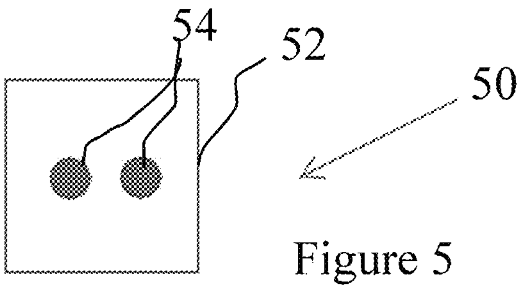
FIG. 5 shows a fifth embodiment of the coaxial directional microwave coupler comprising a square outer conductor and circular inner conductors.
Figure 6:
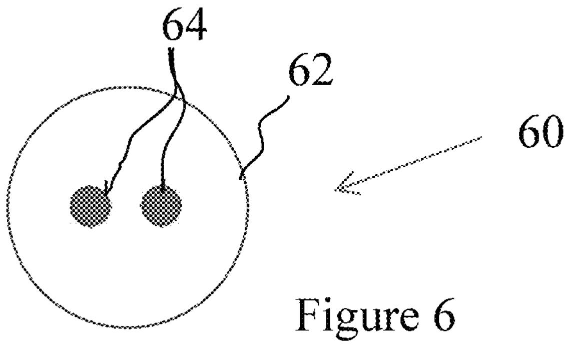
FIG. 6 shows a sixth embodiment of the coaxial directional microwave coupler comprising a circular outer conductor and circular inner conductors.
Figure 7:
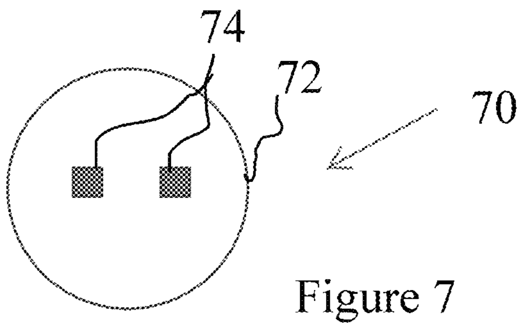
FIG. 7 shows a seventh embodiment of the coaxial directional microwave coupler comprising a circular outer conductor and square inner conductors.

FIGS. 1-7 illustrate embodiments of the coaxial directional microwave coupler disclosed herein. For example, FIG. 1 shows a coaxial directional microwave coupler 10 comprising a rectangular outer conductor 12 and rectangular inner conductors 14. FIG. 2 shows a coaxial directional microwave coupler 20 comprising a rectangular outer conductor 22 and square inner conductors 24. FIG. 3 shows a coaxial directional microwave coupler 30 comprising a rectangular outer conductor 32 and circular inner conductors 34. FIG. 4 shows a coaxial directional microwave coupler 40 comprising a square outer conductor 42 and square inner conductors 44. FIG. 5 shows a coaxial directional microwave coupler 50 comprising a square outer conductor 52 and circular inner conductors 54. FIG. 6 shows a coaxial directional microwave coupler 60 comprising a circular outer conductor 62 and circular inner conductors 64. FIG. 7 shows a coaxial directional microwave coupler 70 comprising a circular outer conductor 72 and square inner conductors 74.

Implementation of the coaxial directional microwave coupler is initiated using strip line equations associated with edge-coupled zero-thickness tri-plate strip line in accordance with the following equations, $$Z_{0e}\sqrt{K} = 29.976\pi\frac{K'(k_e)}{K(k_e)}\Omega \quad (1a)$$

$$Z_{0o}\sqrt{K} = 29.976\pi\frac{K'(k_o)}{K(k_o)}\Omega \quad (1b)$$

wherein $Z_{0e}$ and $Z_{0o}$ are the desired design even mode impedance ($Z_{0e}$) and odd mode impedance ($Z_{0o}$) of the coupled structure and K and K' are complete elliptic integrals of the first kind, as further described in Cohn, Seymour, *Shielded Coupled Strip Transmission Line*, MTT-5, October 1955, pp. 29-37.

Figure 8:
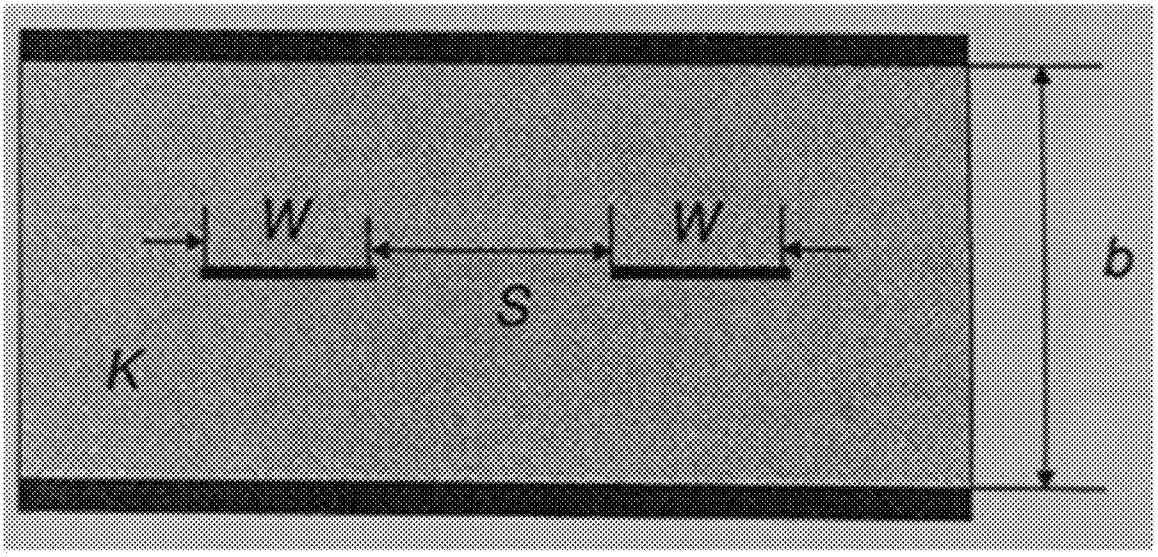
FIG. 8 is an equivalent circuit diagram of the coaxial directional microwave coupler that illustrates a set of parameters to be calculated.

An equivalent circuit diagram of the coaxial directional microwave coupler, which illustrates the set of parameters to be calculated, is shown in FIG. 8. The following equations are used to calculate values of this set of parameters, $$\frac{W}{b} = \frac{2}{\pi}\operatorname{arctanh}\sqrt{k_e k_o} \quad (2a)$$

$$\frac{s}{b} = \frac{2}{\pi}\operatorname{arctanh}\left(\frac{\sqrt{k_e}}{1-k_e} + \frac{1-k_o}{\sqrt{k_o}}\right) \quad (2b)$$

wherein W represents a width of the inner conductors or a cross-sectional area of the inner conductors, s represents a spacing between the inner conductors, $k_4$ and $k_e$ are the arguments of the complete elliptic integral of the first kind, as further described in Cohn, Seymour, *Shielded Coupled Strip Transmission Line*, MTT-5, October 1955, pp. 29-37, and b represents the height of the substrate.

Figure 9:
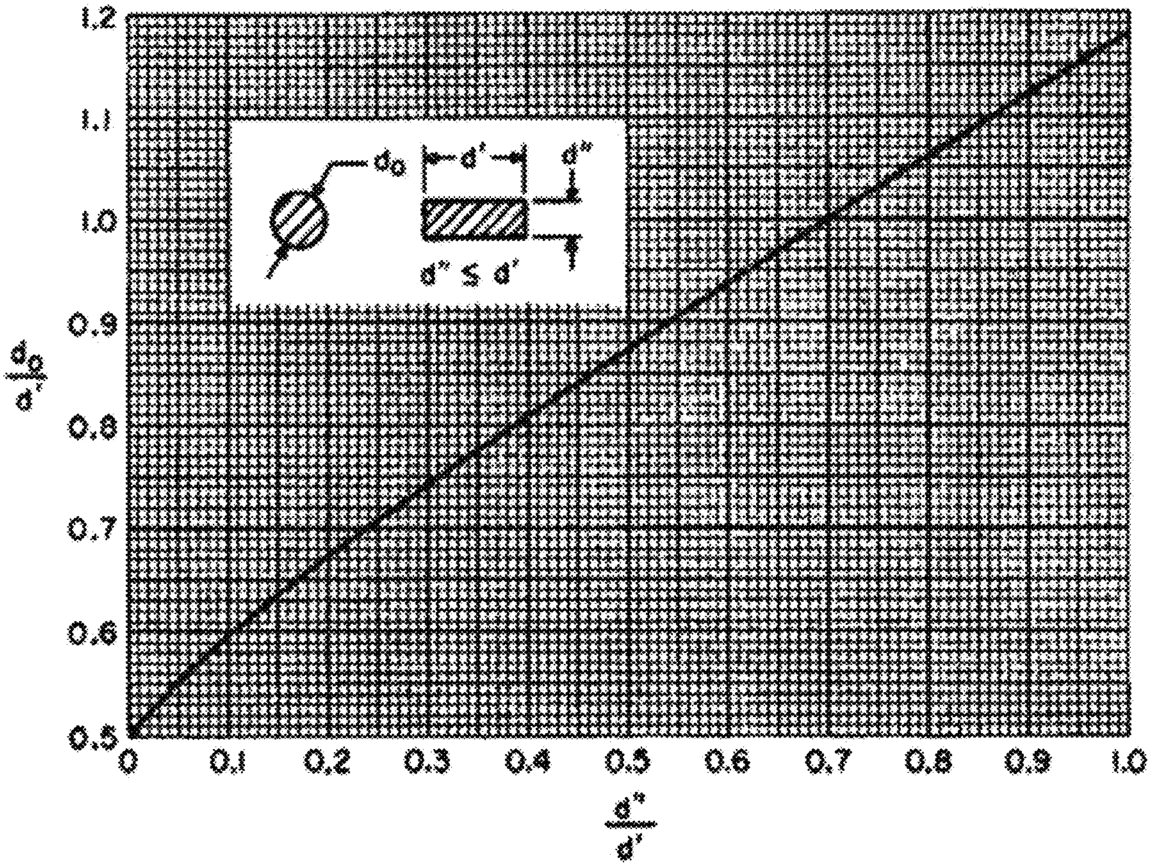
FIG. 9 is a graphical representation of cross-sectional equivalence between circular and rectangular conductors.

The parameters calculated using the above equations may then be converted to circular equivalents using the following equations, $$\frac{d_o}{d'} = \frac{1}{2}\left[1 + \frac{d''}{\pi d'}\left(1 + \ln\frac{4\pi d'}{d''}\right)\right], \text{ for } \frac{d''}{d'} \le 0.06 \quad (3a)$$

$$\frac{d_o}{d'} = \frac{1}{2}\left[1 + \frac{d''}{d'}\left(1 + \ln\frac{4\pi d'}{d''} + 0.510\left(\frac{d''}{d'}\right)^2\right)\right], \text{ for } 0.06 < \frac{d''}{d'} < 0.11 \quad (3b)$$

$$Z_0 = \frac{60}{\sqrt{\varepsilon_r}}\ln\frac{4b}{\pi d_0}\Omega \quad (3c)$$

wherein $Z_0$ represents a characteristic impedance of the substrate, $d_o$ represents a diameter of an equivalent circular cross-section of the conductor, $\varepsilon_r$, represents a dielectric constant of the substrate, and d' and d" represent the larger and smaller rectangular dimensions of the inner conductors, respectively, as illustrated in FIG. 9. For equivalent structures beyond the limits of $d''/d' \le 0.06$ and $0.06 < d''/d' < 0.11$, an approximation is calculated using the graphical representation of cross-section equivalence between circular and rectangular conductors, as shown in FIG. 9.

In a first example, a 90° coaxial directional microwave coupler, which includes a circular outer conductor and circular inner conductors, is implemented. The coaxial directional microwave coupler exhibits −3 dB coupling at a center frequency of 168 MHz. A rectangular coupled structure having the following characteristics is assumed, which may be the desired operating characteristics of the 90° coaxial directional microwave coupler, $$Z_o = 51.8\ \Omega,\ Z_{0o} = 21.45\ \Omega,\ Z_{0e} = 125.08\ \Omega \quad (4)$$

wherein $Z_o$ is the characteristic impedance, and $Z_{0e}$ and $Z_{0o}$ are the desired design even mode impedance ($Z_{0e}$) and odd mode impedance ($Z_{0o}$) of the coupled structure. The inner conductor width W, spacing between inner conductors s, substrate thickness b, and coupling, respectively, are calculated by applying equations (2a) and (2b) above, which yields the following results.

$$W = .010'',\ s = .002'',\ b.072'',\ \text{Coupling} = -3008\ \text{dB} \quad (5)$$

Equivalent circular dimensions are as follows.

$$d_o = .0118'',\ D_o = .0978'' \quad (6)$$

Due to conductor and material availability, the calculated dimensions in equations (6) are modified to be as follows.

$$d_o = .0126'',\ D_o = .097'',\ s = .002'' \quad (7)$$

Figure 10:
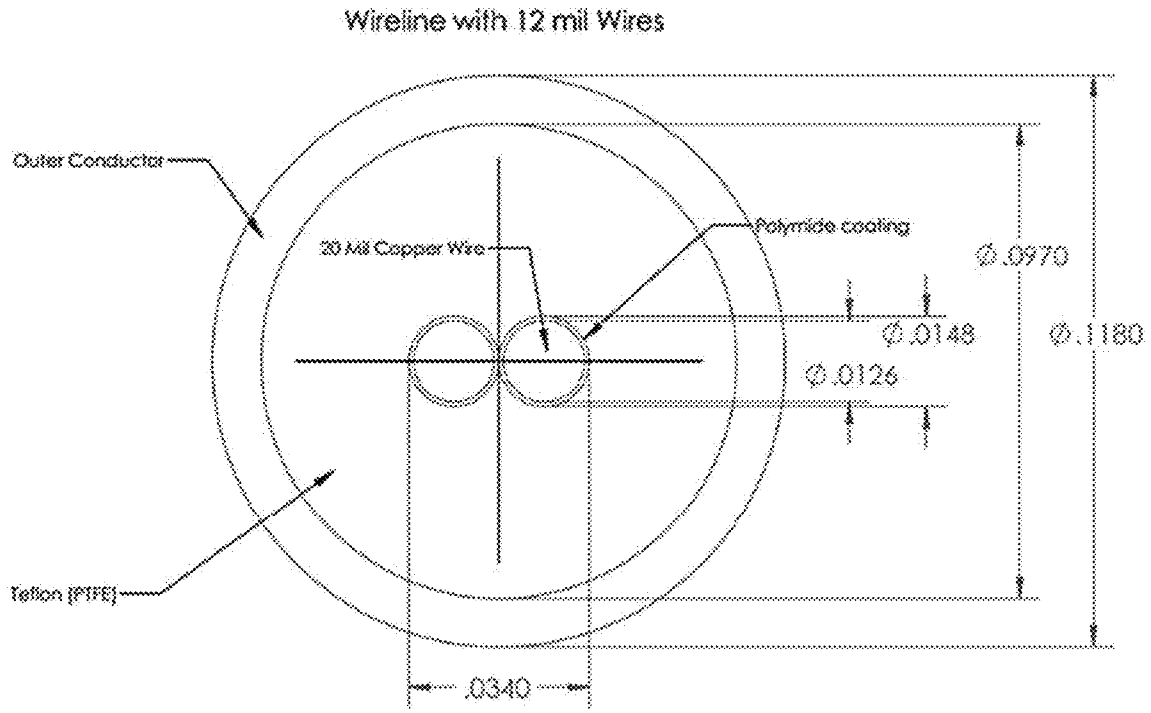
FIG. 10 is a cross-sectional view of a first version of the sixth embodiment of the coaxial directional microwave coupler comprising a circular outer conductor and circular inner conductors.

FIG. 10 shows a cross-sectional view of the first example of the coaxial directional microwave coupler comprising a circular outer conductor and circular inner conductors.

Figure 11:
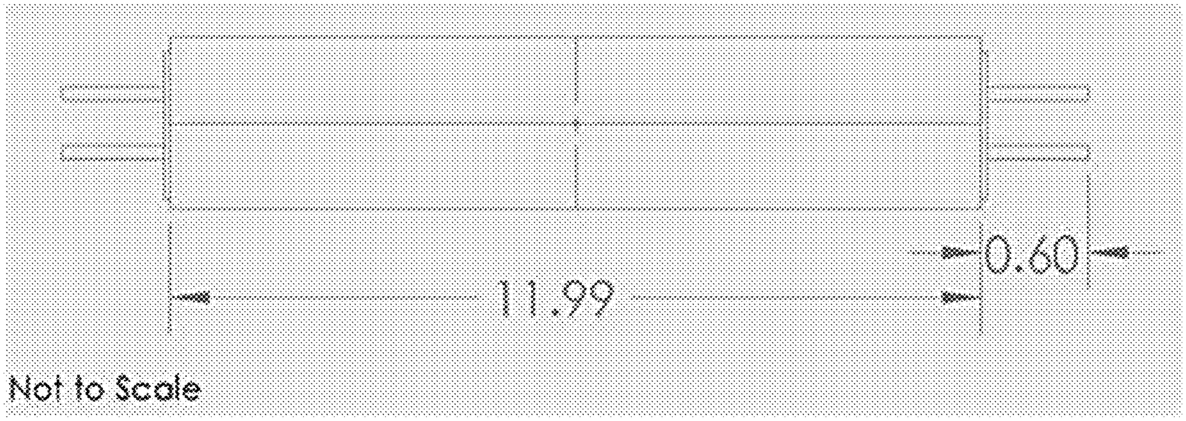
FIG. 11 is a side view of the first version of the sixth embodiment of the coaxial directional microwave coupler.
Figure 12:
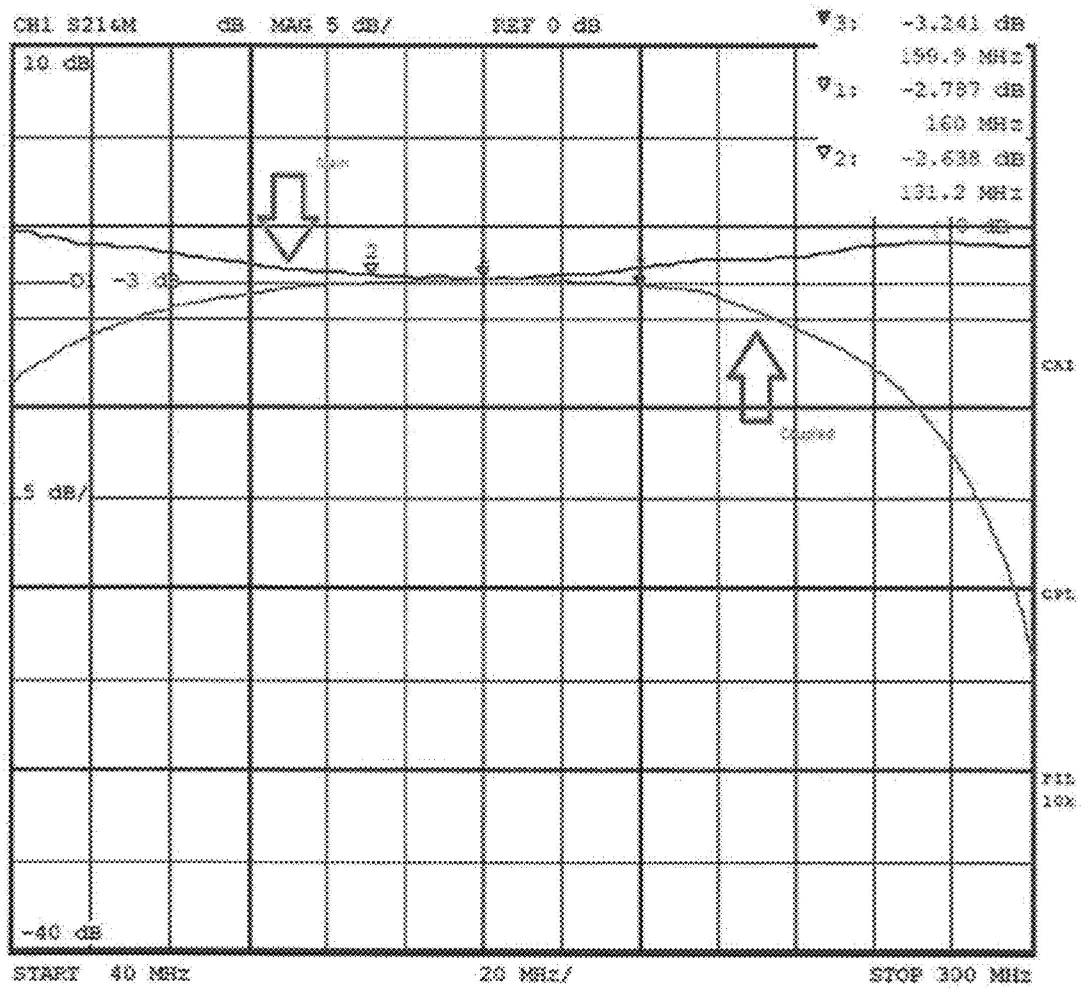
FIG. 12 is a graphical representation of coupling between inner conductors as a function of frequency.
Figure 13:
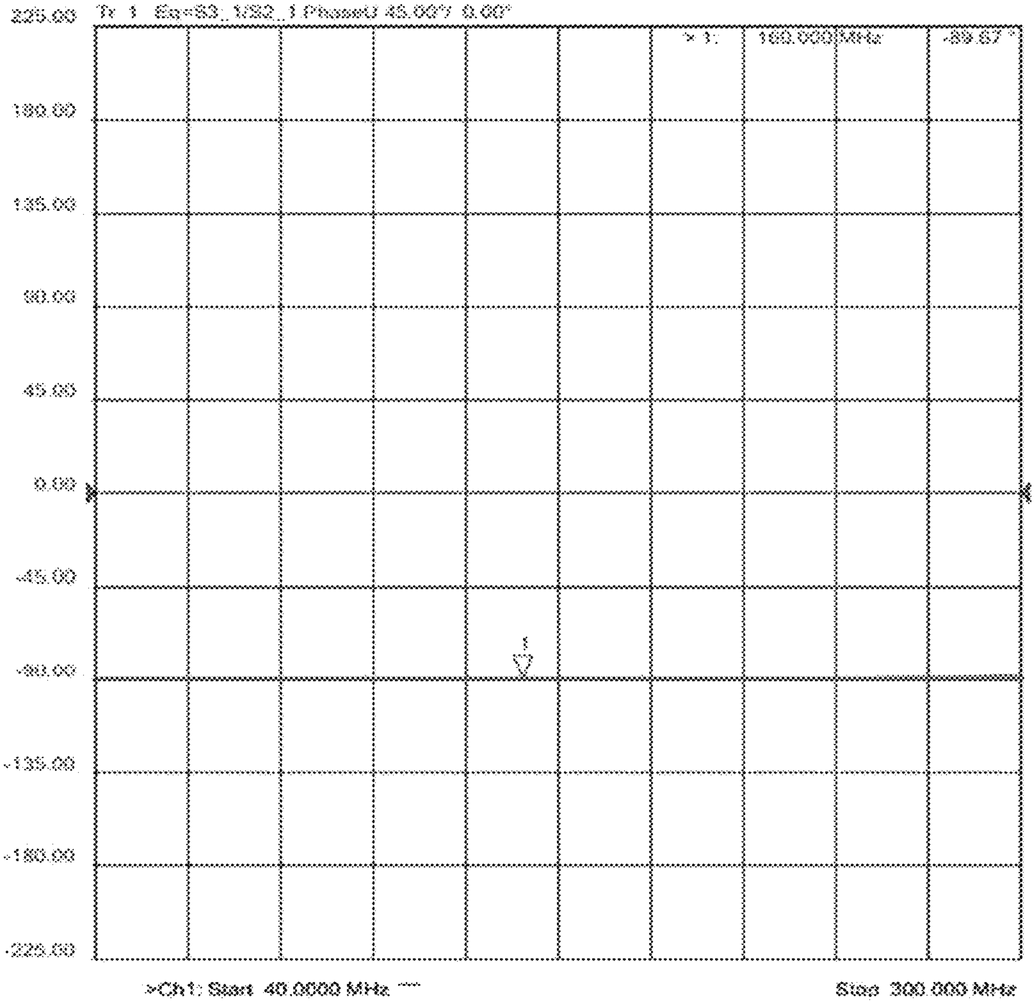
FIG. 13 is a graphical representation of phase variation between inner conductors as a function of frequency.
Figure 14:
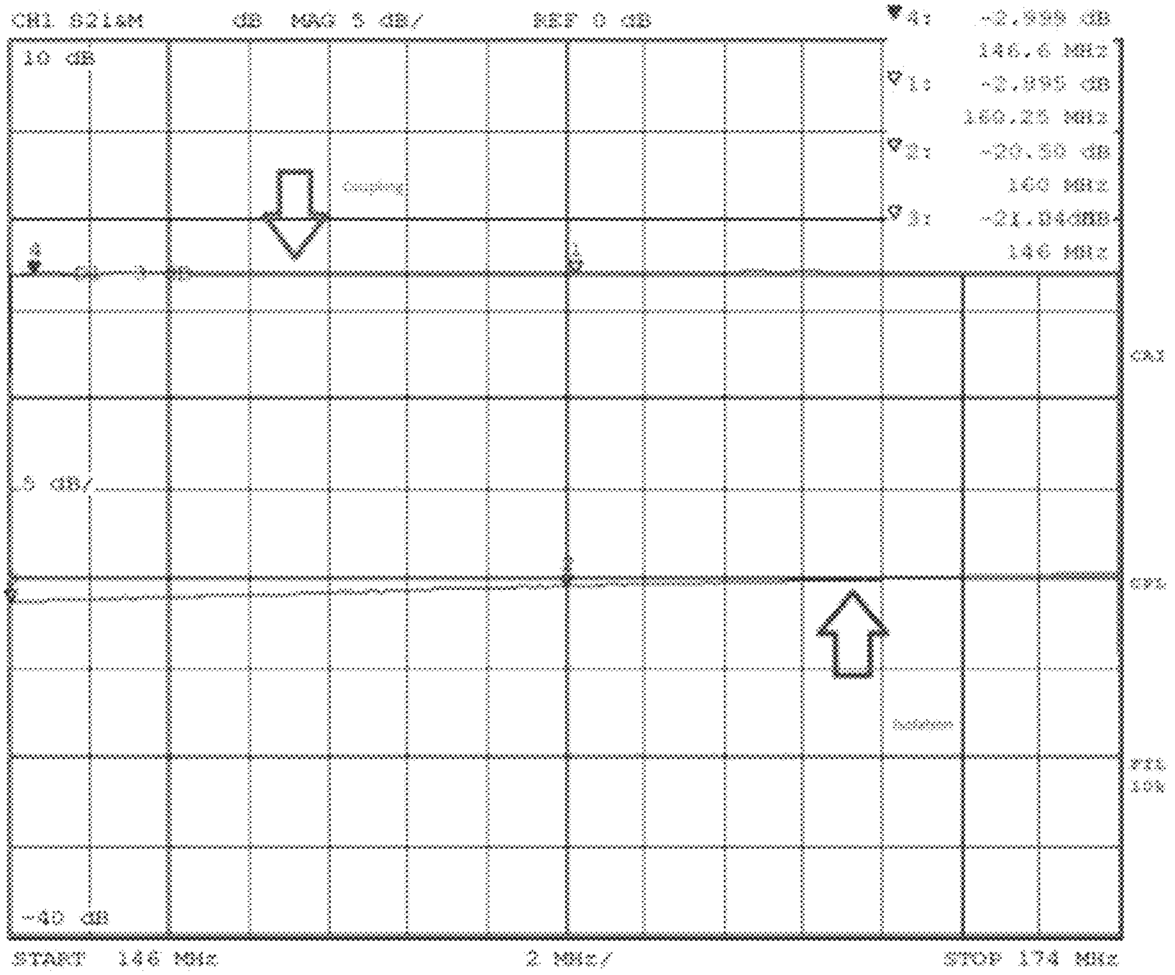
FIG. 14 is a graphical representation of isolation between inner conductors as a function of frequency.
Figure 15:
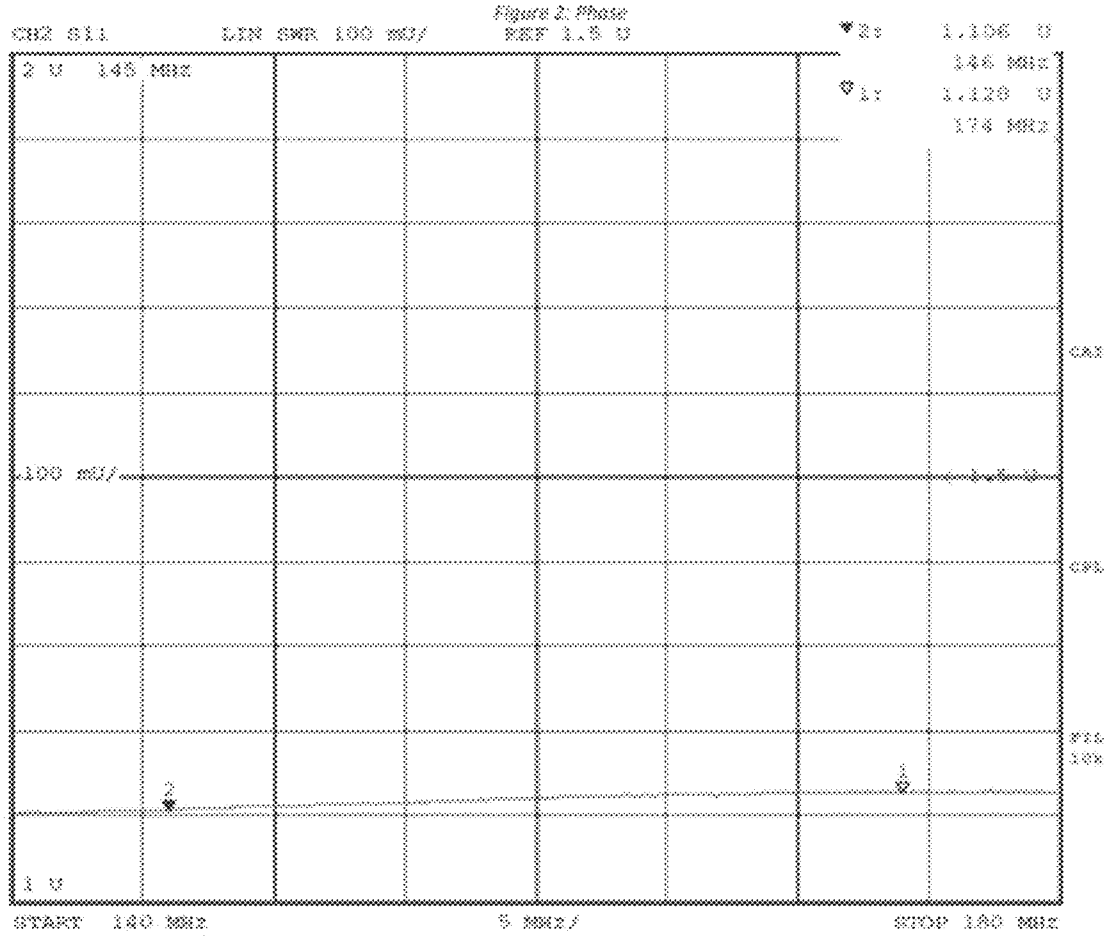
FIG. 15 is a graphical representation of the input port voltage standing wave ratio (VSWR) between inner conductors as a function of frequency.
Figure 16:
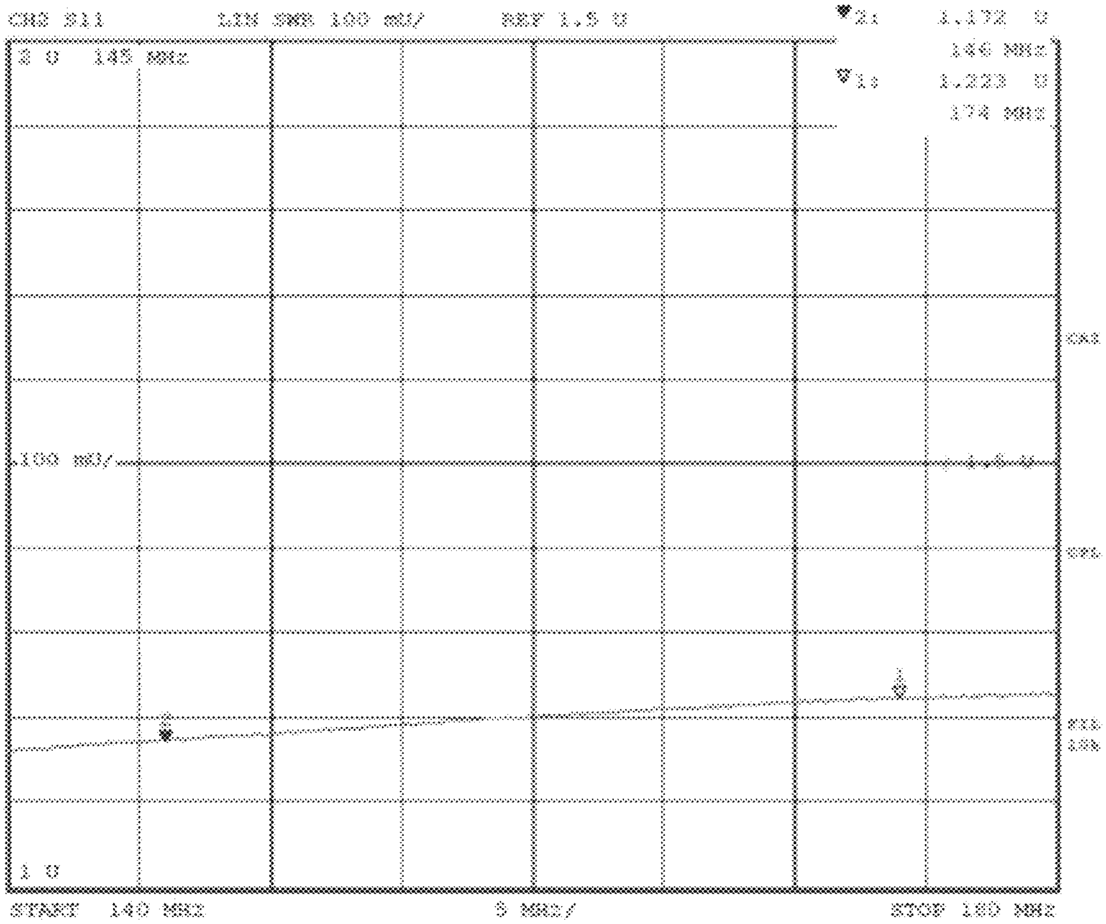
FIG. 16 is a graphical representation of the output port VSWR between inner conductors as a function of frequency.
Figure 17:
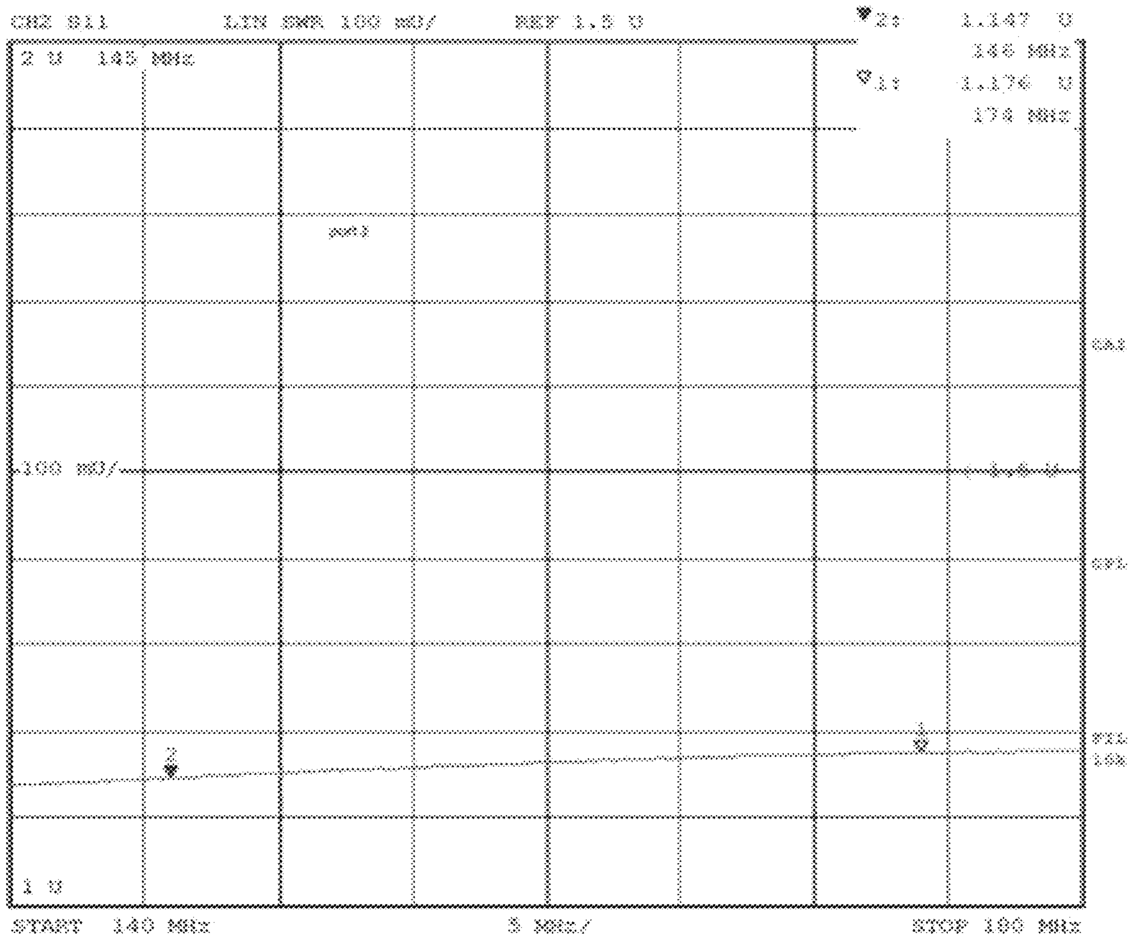
FIG. 17 is a graphical representation of the coupled port VSWR between inner conductors as a function of frequency.
Figure 18:
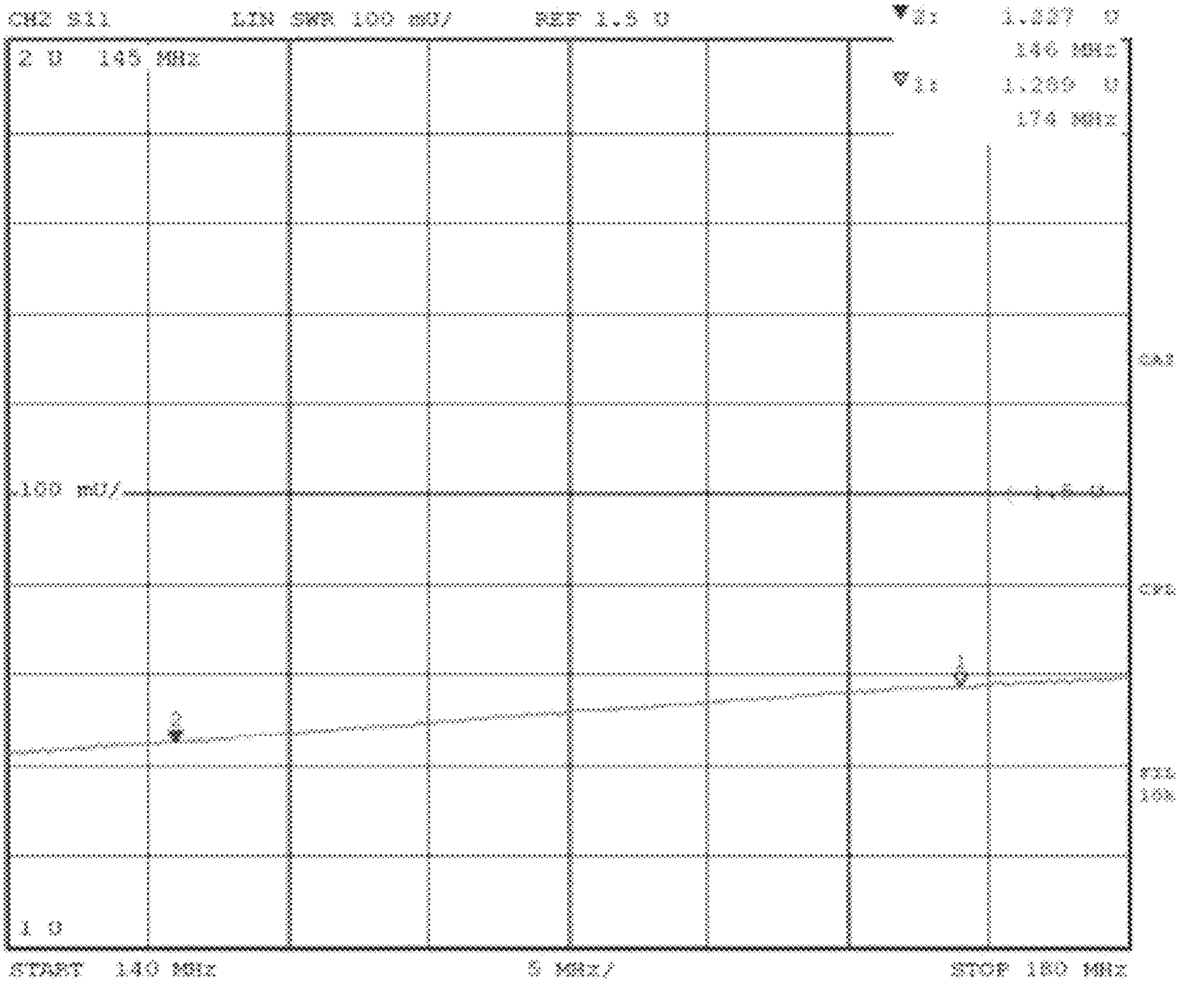
FIG. 18 is a graphical representation of the isolated port VSWR between inner conductors as a function of frequency.

FIG. 11 shows a side view of the first example of the coaxial directional microwave coupler.

The device is constructed with two circular conductors of diameter $d_o$, outer conductor jacket of diameter $D_o$, and spacing s. A coating is used to maintain inner conductor spacing. A suitable dielectric is used to separate inner and outer conductors. FIGS. 12-18 illustrate experimental results corresponding to the first example discussed above.

The illustrations of embodiments described herein are intended to provide a general understanding of the structure of various embodiments, and the embodiments are not intended to serve as a complete description of all the elements and features of apparatus and systems that might make use of the structures described herein. Many other embodiments will be apparent to those skilled in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those skilled in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. A coaxial directional microwave coupler, which comprises:

an outer conductor; and a plurality of inner conductors at least partially surrounded by the outer conductor, the coaxial directional microwave coupler being implemented in accordance with the following equations, $$Z_{0e}\sqrt{K} = 29.976\pi\frac{K'(k_e)}{K(k_e)}\Omega \tag{1a}$$

$$Z_{0o}\sqrt{K} = 29.976\pi\frac{K'(k_o)}{K(k_o)}\Omega \tag{1b}$$

wherein $Z_{0e}$ and $Z_{0o}$ are desired design even mode impedance ($Z_{0e}$) and odd mode impedance ($Z_{0o}$) of the coaxial directional microwave coupler, K and K' are complete elliptic integrals of a first kind, and $k_o$ and $k_e$ are arguments of the complete elliptic integrals of the first kind.

2. The coaxial directional microwave coupler, as defined by claim 1, wherein the coaxial directional microwave coupler is implemented in accordance with the following equations, $$\frac{W}{b} = \frac{2}{\pi}\operatorname{arctanh}\sqrt{k_e k_o} \tag{2a}$$

$$\frac{s}{b} = \frac{2}{\pi}\operatorname{arctanh}\left(\frac{\sqrt{k_e}}{1-k_e} + \frac{1-k_o}{\sqrt{k_o}}\right) \tag{2b}$$

wherein W represents a width of at least one of the inner conductors or a cross-sectional area of at least one of the inner conductors, s represents a spacing between at least two of the plurality of inner conductors, $k_o$ and $k_e$ are the arguments of the complete elliptic integrals of the first kind, and b represents a height of a substrate.

3. The coaxial directional microwave coupler, as defined by claim 2, wherein parameters of the coaxial directional microwave coupler calculated in accordance with equations (2a) and (2b) are converted to circular equivalents using the following equations, $$\frac{d_o}{d'} = \frac{1}{2}\left[1 + \frac{d''}{\pi d'}\left(1 + \ln\frac{4\pi d'}{d''}\right)\right], \text{ for } \frac{d''}{d'} \le 0.06 \tag{3a}$$

$$\frac{d_o}{d'} = \frac{1}{2}\left[1 + \frac{d''}{d'}\left(1 + \ln\frac{4\pi d'}{d''} + 0.510\left(\frac{d''}{d'}\right)^2\right)\right], \text{ for } 0.06 < \frac{d''}{d'} < 0.11 \tag{3b}$$

$$Z_0 = \frac{60}{\sqrt{\varepsilon_r}}\ln\frac{4b}{\pi d_0}\Omega \tag{3c}$$

wherein $Z_0$ represents a characteristic impedance of the substrate, $d_o$ represents a diameter of an equivalent circular cross section of at least one of the plurality of inner conductors, $\varepsilon_r$ represents a dielectric constant of the substrate, and d' and d" represent dimensions of at least two of the plurality of inner conductors.

4. A method of implementing a coaxial directional microwave coupler, which comprises:

at least partially surrounding a plurality of inner conductors by an outer conductor; and implementing the coaxial directional microwave coupler in accordance with the following equations, $$Z_{0e}\sqrt{K} = 29.976\pi\frac{K'(k_e)}{K(k_e)}\Omega \quad (1a)$$

$$Z_{0o}\sqrt{K} = 29.976\pi\frac{K'(k_o)}{K(k_o)}\Omega \quad (1b)$$

wherein $Z_{0e}$ and $Z_{0o}$ are desired design even mode impedance ($Z_{0e}$) and odd mode impedance ($Z_{0o}$) of the coaxial directional microwave coupler, K and K' are complete elliptic integrals of a first kind, and $k_o$ and $k_e$ are arguments of the complete elliptic integrals of the first kind.

5. The method of implementing a coaxial directional microwave coupler, as defined by claim 4, further comprising:

implementing the coaxial directional microwave coupler in accordance with the following equations, $$\frac{W}{b} = \frac{2}{\pi}\text{arctanh}\sqrt{k_e k_o} \quad (2a)$$

$$\frac{s}{b} = \frac{2}{\pi}\text{arctanh}\left(\frac{\sqrt{k_e}}{1-k_e} + \frac{1-k_o}{\sqrt{k_o}}\right) \quad (2b)$$

wherein W represents a width of at least one of the plurality of inner conductors or a cross-sectional area of at least one of the plurality of inner conductors, s represents a spacing between at least two of the plurality of inner conductors, $k_o$ and $k_e$ are the arguments of the complete elliptic integrals of the first kind, and b represents a height of a substrate.

6. The method of implementing a coaxial directional microwave coupler, as defined by claim 5, further comprising:

converting parameters of the coaxial directional microwave coupler calculated in accordance with equations (2a) and (2b) to circular equivalents using the following equations, $$\frac{d_o}{d'} = \frac{1}{2}\left[1 + \frac{d''}{\pi d'}\left(1 + \ln\frac{4\pi d'}{d''}\right)\right], \text{ for } \frac{d''}{d'} \le 0.06 \quad (3a)$$

$$\frac{d_o}{d'} = \frac{1}{2}\left[1 + \frac{d''}{d'}\left(1 + \ln\frac{4\pi d'}{d''} + 0.510\left(\frac{d''}{d'}\right)^2\right)\right], \text{ for } 0.06 < \frac{d''}{d'} < 0.11 \quad (3b)$$

$$Z_0 = \frac{60}{\sqrt{\varepsilon_r}}\ln\frac{4b}{\pi d_0}\Omega \quad (3c)$$

wherein $Z_0$ represents a characteristic impedance of the substrate, $d_o$ represents a diameter of an equivalent circular cross section of at least one of the plurality of inner conductors, $\varepsilon_r$ represents a dielectric constant of the substrate, and d' and d" represent dimensions of at least two of the plurality of inner conductors.

* * * * *